US009727842B2

(12) United States Patent
Caceres

(10) Patent No.: US 9,727,842 B2
(45) Date of Patent: Aug. 8, 2017

(54) DETERMINING ENTITY RELEVANCE BY RELATIONSHIPS TO OTHER RELEVANT ENTITIES

(75) Inventor: Barry M. Caceres, Las Vegas, NV (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2096 days.

(21) Appl. No.: 12/545,681

(22) Filed: Aug. 21, 2009

(65) Prior Publication Data

US 2011/0047167 A1  Feb. 24, 2011

(51) Int. Cl.
*G06F 17/30* (2006.01)
*G06Q 10/10* (2012.01)

(52) U.S. Cl.
CPC .................... *G06Q 10/10* (2013.01)

(58) Field of Classification Search
USPC ............... 707/607, 609, 687, 705, 790, 821
See application file for complete search history.

(56) References Cited

U.S. PATENT DOCUMENTS

| 6,292,795 | B1 | 9/2001 | Peters et al. |
| 6,424,968 | B1 | 7/2002 | Broster et al. |
| 6,460,025 | B1 | 10/2002 | Fohn et al. |
| 6,704,874 | B1 | 3/2004 | Porras et al. |
| 6,816,850 | B2 | 11/2004 | Culliss |
| 6,845,372 | B2 * | 1/2005 | Bates et al. |
| 7,254,570 | B2 | 8/2007 | Stickler |
| 7,480,645 | B2 * | 1/2009 | Allys et al. |
| 7,542,969 | B1 | 6/2009 | Rappaport et al. |
| 7,546,287 | B2 * | 6/2009 | Subramaniam et al. |
| 7,565,367 | B2 * | 7/2009 | Barrett et al. |
| 7,599,911 | B2 * | 10/2009 | Manber et al. |
| 7,664,734 | B2 * | 2/2010 | Lawrence et al. ..... 707/999.003 |
| 7,962,446 | B2 * | 6/2011 | Subramaniam et al. ..... 707/610 |

(Continued)

FOREIGN PATENT DOCUMENTS

| CA | 2404941 A1 | 10/2001 |
| CA | 2547713 A1 | 6/2005 |
| EP | 1122694 A2 | 8/2001 |

OTHER PUBLICATIONS

Zong, Mao-Sheng, et al. "A New Method of Relevance Measure and Its Applications," 18th International Workshop on Database and Expert Systems Applications, (2007) IEEE Computer Society, pp. 595-600.

(Continued)

*Primary Examiner* — Sana Al Hashemi
(74) *Attorney, Agent, or Firm* — Patterson + Sheridan, LLP

(57) ABSTRACT

An entity resolution system configured to process an inbound identity record and to generate a relevance score for the inbound identity record is disclosed. One process of resolving identity records and detecting relationships between entities may be performed using a pre-determined or configurable entity resolution rules. Further, the entity resolution system may assign base relevance scores, association relevance scores, and derived relevance scores to each resolved entity. The relevance score for the inbound identity record may be computed based on base relevance scores, association relevance scores, derived relevance scores, and/or relationship strengths of entities related to the inbound identity record.

25 Claims, 3 Drawing Sheets

(56) References Cited

U.S. PATENT DOCUMENTS

| | | |
|---|---|---|
| 2002/0161718 A1 | 10/2002 | Coley et al. |
| 2003/0023722 A1 | 1/2003 | Vinberg |
| 2003/0093514 A1 | 5/2003 | Valdes et al. |
| 2003/0177118 A1 | 9/2003 | Moon et al. |
| 2004/0006748 A1 | 1/2004 | Srivastava et al. |
| 2004/0177053 A1 | 9/2004 | Donoho et al. |
| 2005/0076060 A1 | 4/2005 | Finn et al. |
| 2005/0171946 A1 | 8/2005 | Maim |
| 2005/0198099 A1 | 9/2005 | Motsinger et al. |
| 2005/0216953 A1 | 9/2005 | Ellingson |
| 2005/0283753 A1 | 12/2005 | Ho et al. |
| 2006/0031203 A1 | 2/2006 | Rosenbaum et al. |
| 2006/0036599 A1 | 2/2006 | Glaser et al. |
| 2006/0122978 A1 | 6/2006 | Brill et al. |
| 2006/0149674 A1 | 7/2006 | Cook et al. |
| 2006/0202012 A1 | 9/2006 | Grano et al. |
| 2007/0005892 A1 | 1/2007 | Mullender et al. |
| 2007/0078973 A1 | 4/2007 | Kussmaul et al. |
| 2007/0106659 A1 | 5/2007 | Lu et al. |
| 2007/0112607 A1 | 5/2007 | Tien et al. |
| 2007/0136343 A1 | 6/2007 | Wang et al. |
| 2007/0168448 A1 | 7/2007 | Garbow et al. |
| 2007/0179945 A1 | 8/2007 | Marston et al. |
| 2007/0179949 A1 | 8/2007 | Sun et al. |
| 2007/0220043 A1 | 9/2007 | Oliver et al. |
| 2007/0233559 A1 | 10/2007 | Golec |
| 2008/0005076 A1 | 1/2008 | Payne et al. |
| 2008/0103800 A1 | 5/2008 | Domenikos et al. |
| 2008/0162514 A1 | 7/2008 | Franks et al. |
| 2008/0243607 A1 | 10/2008 | Rohan et al. |
| 2008/0281812 A1 | 11/2008 | Sotos |
| 2008/0306908 A1 | 12/2008 | Agrawal et al. |
| 2008/0319731 A1 | 12/2008 | Chambliss et al. |
| 2009/0083262 A1 | 3/2009 | Chang et al. |
| 2009/0271394 A1* | 10/2009 | Allen .................... G06Q 30/02 |

OTHER PUBLICATIONS

IBM Entity Analytic Solutions V4.1.0 Delivers Powerful, Anonymous Identity Recognition and Relationship Awareness, IBM Software Announcement, May 23, 2006, 206/117, pp. 1-6.

Wu, Shengli, et al. "Regression Relevance Models for Data Fusion," 18th International Workshop on Database and Expert Systems Applications, (2007) IEEE Computer Society, pp. 264-268.

Canadian Search Report, Application No. 2,680,594, Jun. 15, 2011, 4 pages.

Boldt et al.; "Automated Spyware Detection Using End User License Agreements"; Proceedings of ISA 2008, The Second International Conference on Information Security and Assurance, held Apr. 24-26, 2008 in Busan, Korea (IEEE Computer Security, 2008).

Office Action for U.S. Appl. No. 12/111,626 dated Mar. 30, 2011.

Balahur et al., "A feature dependent method for opinion mining and classification," NLP-KE '08 International Conference on Natural Language Processing and Engineering, Oct. 2008: pp. 1-7.

Notice of Allowance for U.S. Appl. No. 12/111,753 dated Mar. 1, 2011.

Notice of Allowance of U.S. Appl. No. 12/111,753 dated May 5, 2011.

Wang, JR and Masnick, SE, "The Inter-database Instance Identification Problem in Integrating Autonomous Systems", Fifth International Conference on Data Engineering Proceedings, 1989 pp. 46-55.

Singhal et al., Data Mining for Intrusion Detection, Sep. 2005, Springer US, Data Mining and Knowledge Discovery Handbook, pp. 1225-1237.

Phua et al., Temporal Representation in Spike Detection of Sparse Personal Identity Streams, Apr. 2006, Springer Berlin, Intelligence and Security Informatics WISI 2006, pp. 115-126.

Dzunic et al., "Coreference Resolution using Decision Trees," 8th Seminar on Neural Network Applications in Electrical Engineering, Sep. 2006: pp. 109-114.

He et al., "A Neural Networks-Based Graph Algorithm for Cross-Document Coreference Resolution," NLP-KE '08 International Conference on Natural Language Processing and Engineering, Oct. 2008: pp. 1-9.

Huang et al., "Coreference resolution in biomedical full-text articles with domain dependent features," 2010 2nd International Conference on Computer Technology and Development (ICCT), Nov. 2010: pp. 616-620.

\* cited by examiner

DETERMINING ENTITY RELEVANCE BY RELATIONSHIPS TO OTHER RELEVANT ENTITIES

BACKGROUND OF THE INVENTION

Field of the Invention

Embodiments of the invention generally relate to determining relevance of an entity in an entity resolution system, and more particularly, to a variety of techniques for assigning a degree of relevance to an entity by relationships to other relevant entities of an entity resolution system.

Description of the Related Art

In an entity resolution system, identity records are loaded and resolved against known identities to derive a network of entities and relationships between entities. An "entity" generally refers to an organizational unit used to store identity records that are resolved at a "zero-degree relationship." That is, each identity record associated with a given entity is believed to describe the same person, place, or thing. Thus, one entity may reference multiple individual identities. This is frequently benign, e.g., in a case where an entity includes two identities, a first with identity records identifying a woman based on a familial surname and a second identity with records identifying the same woman based on a married surname. Of course, in other cases, multiple identities may be an indication of mischief or a problem, e.g., in a case where one individual is impersonating another, using a fictitious identity, or engaging in some form of identity theft. The entity resolution system may link entities to one another by relationships. For example, a first entity may have a $1^{st}$ degree with a second entity based on identity records (in one entity, the other, or both) that indicate the individuals represented by these two entities are married to one another, reside at the same address, or share some other common information.

One task performed by an entity resolution system is to generate alerts when the existence of a particular identity record (typically the inbound record being processed) causes some condition to be satisfied that is relevant in some way and that may require additional scrutiny by an analyst. The result of these processes is typically a list of alerts about identities or entities that should be examined by an analyst. Relevance detection may be used to help identify potential threats and fraud as well as potential opportunity.

Additionally, entity resolution systems typically include (or are compatible with) an entity resolution alert analysis system that allow analysts to review and analyze alerts, entities, and identities, as well as provide comments or assign a disposition to alerts. In such systems, an assigned disposition often takes the form of a tagged value that provides an alert lifecycle (e.g., "NEW", "OPEN", "CLOSED", "INVESTIGATING", etc.).

Generally, an entity resolution system is adept at finding relationships between identity records (including zero-degree relationships where the two identity records are believed to be the same entity). Further, entity resolution systems typically use alerts to notify when a relevant relationship is found (e.g., "Criminal knows/is Employee"). Alerting can be based on criteria of the identity records, including, but not limited to, the assignment of roles to specific identity records (e.g., identity records loaded from an employee database may be tagged as "Employees," while those loaded from an FBI most-wanted list may be tagged as "Criminals"). However, such an entity resolution system cannot determine an entity relevance score when the entity resolution system does not generate or track alerts (i.e., from which relevance may be derived).

SUMMARY OF THE INVENTION

One embodiment of the invention includes a computer-implemented method. The method may generally include configuring one or more computer processors to perform an operation for processing identity records received by an entity resolution system. The entity resolution system is configured to match identity records referencing a common individual to an entity. The operation itself may generally include receiving an identity record, resolving the identity record against a set of known entities in the entity resolution system to identify a first entity to associate with the received identity record, and determining a base relevance score to assign to the first entity based on relevance scores assigned to one or more identity records associated with the first entity.

In a particular embodiment, the operation may further include identifying one or more entities related to the first entity and determining an association relevance score to assign to the first entity based on a relevance score assigned to at least one related entity and a relationship strength between the entity and the at least one related entity. The relevance score of the at least one related entity is calculated from a plurality of identity records associated with the at least one related entity. In one embodiment, the operation may further include determining a derived relevance score to assign to the first entity based on the base relevance score and the association relevance score.

Another embodiment of the invention includes a computer-readable storage medium containing a program, which, when executed on a processor, performs an operation for processing identity records received by an entity resolution system. The entity resolution system is configured to match identity records referencing a common individual to an entity. The operation itself may generally include receiving an identity record, resolving the identity record against a set of known entities in the entity resolution system to identify a first entity to associate with the received identity record, and determining a base relevance score to assign to the first entity based on relevance scores assigned to one or more identity records associated with the first entity.

Still another embodiment includes a system having one or more computer processors and a memory containing a program, which when executed by the processor is configured to perform an operation for processing identity records received by an entity resolution system. The entity resolution system is configured to match identity records referencing a common individual to an entity. The operation itself may generally include receiving an identity record, resolving the identity record against a set of known entities in the entity resolution system to identify a first entity to associate with the received identity record, and determining a base relevance score to assign to the first entity based on relevance scores assigned to one or more identity records associated with the first entity.

Yet another embodiment of the invention includes a computer-implemented method. This method may generally include configuring one or more computer processors to perform an operation for processing identity records received by an entity resolution system. The entity resolution system is configured to match identity records referencing a common individual to an entity. The operation itself may generally include receiving a search identity record and resolving the search identity record against a set of known entities in the entity resolution system to identify a first entity to associate with the search identity record. The operation may further include identifying one or more entities related to the first entity and determining an association relevance score to assign to the first entity based on a relevance score assigned to at least one related entity and a relationship strength between the entity and the at least one related entity.

Still another embodiment includes a computer-readable storage medium containing a program, which, when executed on a processor, performs an operation for processing identity records received by an entity resolution system. The entity resolution system is configured to match identity records referencing a common individual to an entity. The operation itself may generally include receiving a search identity record and resolving the search identity record against a set of known entities in the entity resolution system to identify a first entity to associate with the search identity record. The operation may further include identifying one or more entities related to the first entity and determining an association relevance score to assign to the first entity based on a relevance score assigned to at least one related entity and a relationship strength between the entity and the at least one related entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
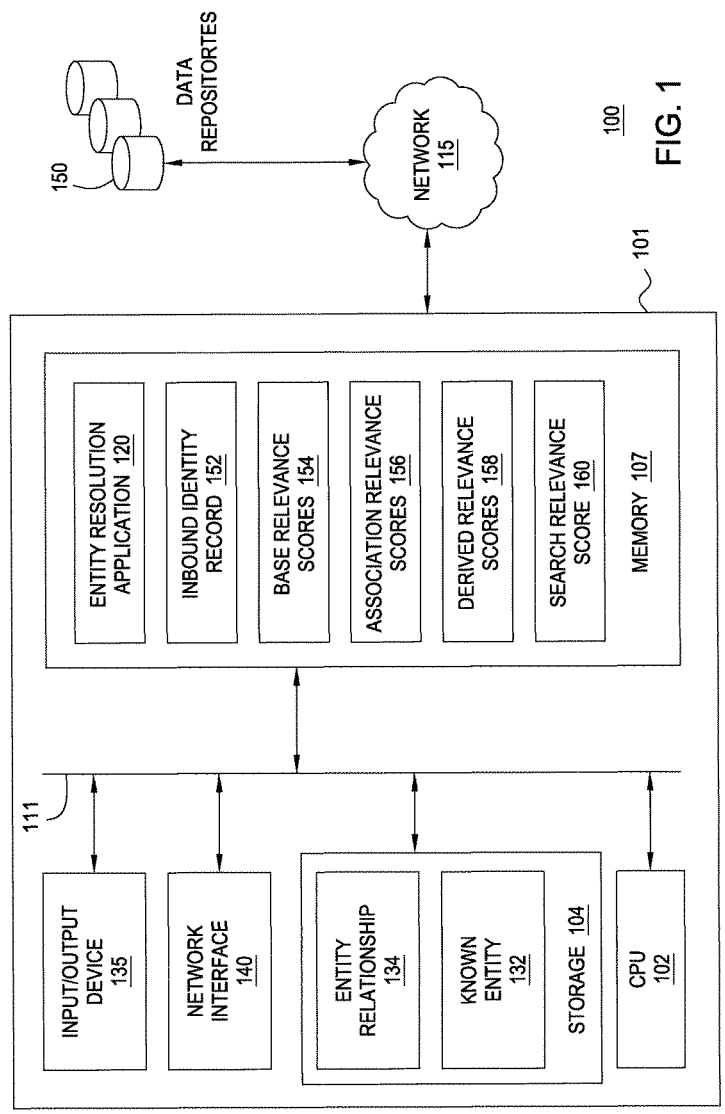
FIG. 1 is a block diagram illustrating a computing environment that includes an entity resolution application, according to one embodiment of the invention.

Embodiments of the invention provide an entity resolution system configured to process inbound identity records based on relevant identities, entities, conditions, activities, or events. The process of resolving identity records and detecting relationships between entities may be performed using a pre-determined or configurable entity resolution rules. Typically, relationships between two entities are derived from information (e.g., a shared address, employer, telephone number, etc.) in identity records that indicate a relationship between the two entities Two examples of such rules include the following:

If the inbound identity record has a matching "Social Security Number" and close "Full Name" to an existing entity, then resolve the new identity to the existing entity.

If the inbound identity record has a matching "Phone Number" to an existing entity, then create a relationship between the entity of the inbound identity record and the one with the matching phone number.

The first rule adds a new inbound record to an existing entity, where the second creates a relationship between two entities based on the inbound record. Of course, the entity resolution rules may be tailored based on the type of inbound identity records and to suit the needs of a particular case.

One embodiment provides an entity resolution system configured to generate a list of entities related to an inbound identity record, based on an entity resolution search. Such a system may not have any need of alerting. For example, security personnel may input personal data of a traveler, as the traveler enters a country, to check the identity of the traveler against a watch list. In particular, the inbound identity record (i.e., of the traveler) need not be loaded into the entity resolution system, but may nevertheless be entity-resolved against existing entities of the entity resolution system. Further, the existing entities of the entity resolution system may contain identity records that include relevance scores provided by a user. For example, a user may provide a higher relevance score for a person of greater significance in the watch list. Entity-resolving the inbound identity record may yield a list of entity records (and contained identity records thereof) determined to relate to or resolve with the inbound identity record. The entity resolution system may assign a relevance score (referred to herein as "search" relevance score) to the inbound identity record. The search relevance score represents a measure of how important the individual represented inbound identity record is to the user performing the search.

The entity resolution system may also determine relevant entities outside of the context of watch lists. For example, both relevant and seemingly non-relevant identity records may be loaded into the entity resolution system. However, a user of the entity resolution system may wish to find relevant entities without having to manage alerts (or lifecycles thereof). For instance, the user may have a set of very important persons (VIPs) with whom the user does business and to whom the user provides special services. The user may wish to ensure that any persons related to those VIPs are invited to experience a similar level of service. In this case, the user may wish to identify all entities related to the VIPs, ranked by an association relevance determined from a relationship between the VIP and another individual and the relevance of the VIP. The user may not wish to configure rules for or otherwise manage alerts—the user merely wishes to know "Who are my most relevant entities?" Further, the user need not be encumbered with a task of sifting through a list of alerts to pick out entities which happen to be alerted on.

In one embodiment, the entity resolution system generates a relevance score for an entity in an entity resolution system without depending on alerts or any associated relevance scores thereof. A user may provide relevance scores for people of known relevance. For example, the relevance scores may be provided for some of the identity records that are loaded into the entity resolution system. The entity resolution system may determine base relevance scores of entities in the entity resolution system. For example, the base relevance score for an entity may be determined from relevance scores provided for identity records resolving to the entity. Further, the entity resolution system may determine an association relevance score for each entity from the base relevance scores of entities related to the respective entity and the relative strength of those relationships. Further still, the entity resolution system may determine a derived relevance score for each entity from the base relevance score and association relevance score of the respective entity. Still further, the entity resolution system may compute a search relevance score for an inbound identity record (e.g., specified by a search request) from the base relevance score, association relevance score and/or the derived relevance score of entities to which the inbound identity record is related and the respective relationship strengths thereof.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a computing environment 100 that includes an entity resolution application 120. FIG. 1 shows a computer system 101 which is included to be representative of existing computer systems, e.g., desktop computers, server computers, laptop computers, tablet computers, and the like. However, the computer system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available.

As shown, computer system 101 includes a central processing unit (CPU) 102, which obtains instructions and data via a bus 111 from memory 107 and storage 104. The CPU 102 represents one or more programmable logic devices that perform all the instruction, logic, and mathematical processing in a computer. For example, the CPU 102 may represent a single CPU, multiple CPUs, a single CPU having multiple processing cores, and the like. Similarly, the memory 107 may be a random access memory. While the memory 107 is shown as a single entity, it should be understood that the memory 107 may comprise a plurality of modules, and that the memory 107 may exist at multiple levels, from high speed registers and caches to lower speed but larger DRAM chips.

The storage 104 stores application programs and data for use by computer system 101. Further, the storage 104 may be a hard disk drive storage device. Although the storage 104 is shown as a single unit, the storage 104 may be a combination of fixed and/or removable storage devices, such as fixed disc drives, floppy disc drives, tape drives, removable memory cards, or optical storage. The memory 107 and the storage 104 may be part of one virtual address space spanning multiple primary and secondary storage devices.

Computer system 101 may be connected to a data communications network 115 (e.g., a local area network, which itself may be connected to other networks such as the internet). As shown, the storage 104 includes a collection of known entities 132 and entity relationships 134. In one embodiment, each known entity 132 stores one or more identity records that are resolved at a "zero-degree relationship." That is, each identity record in a given known entity 132 is believed to describe the same person, place, or thing represented by that known entity 132.

The process of resolving identity records and detecting relationships between entities may be performed using a pre-determined or configurable entity resolution rules. For example, consider the following scenario where an example entity includes the following three identity records:

| Identity 1: | Identity 2: | Identity 3: |
|---|---|---|
| Source: FBI Watch List | Source: HR Database | Source: PO Database |
| Role: Criminal | Role: Employee | Role: Vendor |
| Name: John Doe | Name: John H. Doe | Name: Johnny Doe |
| SSN: 111-11-1111 | SSN: 111-11-1111 | SSN: 111-11-1111 |

Note, in this example, each identity record includes a different variation of a similar name, but each name has the same social security number. Thus, the entity resolution application 120 may resolve these three records to a common entity representing all three identities and store this entity (and each of the identity records) in a set of known entities 132.

Additionally, computer system 101 includes input/output devices 135 such as a mouse, keyboard and monitor, as well as a network interface 140 used to connect the computer system 101 to the network 115.

Entity relationships 134 represent identified connections between two (or more) entities. In one embodiment, relationships between entities may be derived from identity records associated with a first and second entity, e.g., records for the first and second entity sharing and address or phone number. Relationships between entities may also be inferred based on identity records in the first and second entity, e.g., records indicating a role of "employee" for a first entity and a role of "vendor" for a second entity. Relationships may also be based on express statements of relationship, e.g., where an identity record associated with the first entity directly states a relationship to the second e.g., an identity record listing the name of a spouse, parent, child, or other family relation, as well as other relationships such as the name of a friend or work supervisor.

As shown, the memory 107 includes the entity resolution application 120. The memory 107 also includes an inbound identity record 152, base relevance scores 154, association relevance scores 156, derived relevance scores 158, and a search relevance score 160 for the inbound identity record 152. Each type of relevance score is discussed in greater detail below.

In one embodiment, the entity resolution application 120 provides a software application configured to resolve inbound identity records received from the data repositories against the known entities 132. When an inbound record is determined to reference one (or more) of the known entities 132, the record is then associated with that entity 132. Additionally, the entity resolution application 120 may be configured to create relationships 134 (or strengthen or weaken existing relationships) between known entities 132, based on an inbound identity record. For example, the entity resolution application 120 may merge two entities where a new inbound entity record includes the same social security number as one of the known entities 132, but with a name and address of another known entity 132.

As shown, computing environment 100 also includes a set of data repositories 150. In one embodiment, the data repositories 150 each provide a source of inbound identity records processed by the entity resolution application 120. Examples of data repositories 150 include information from public sources (e.g., telephone directories and/or county assessor records, among others). Other examples include information from private sources, e.g., a list of employees and their roles within an organization, information provided by individuals directly such as forms filled out online or on paper, and records created concomitant with an individual engaging in some transaction (e.g., hotel check-in records or payment card use). Additionally, data repositories 150 may include information purchased from vendors selling data records. Of course, the actual data repositories 150 used by the entity resolution application 120 may be tailored to suit the needs of a particular case, and may include any combination of the above data sources listed above, as well as other data sources. Further, information from data repositories 150 may be provided in a "push" manner where identity records are actively sent to the entity resolution application 120 as well as in a "pull" manner where the entity resolution application 120 actively retrieves and/or searches for records from data repositories 150.

In one embodiment, the entity resolution application 120 may be configured to detect identities, entities, conditions, or activities relevant to a user search and which should be the subject of analysis. Further, the user search may include the inbound identity record 152. Once the inbound identity record 152 is resolved against a given entity, relevance detection rules 128 may be evaluated to determine whether the entity, with the new identity record, satisfies conditions specified by any one of the relevance detection rules. That is, the entity resolution application 120 may determine entities relevant to the entity having the new identity record. The entity resolution application 120 may also determine the search relevance score 160 for the inbound identity record 152.

Figure 2:
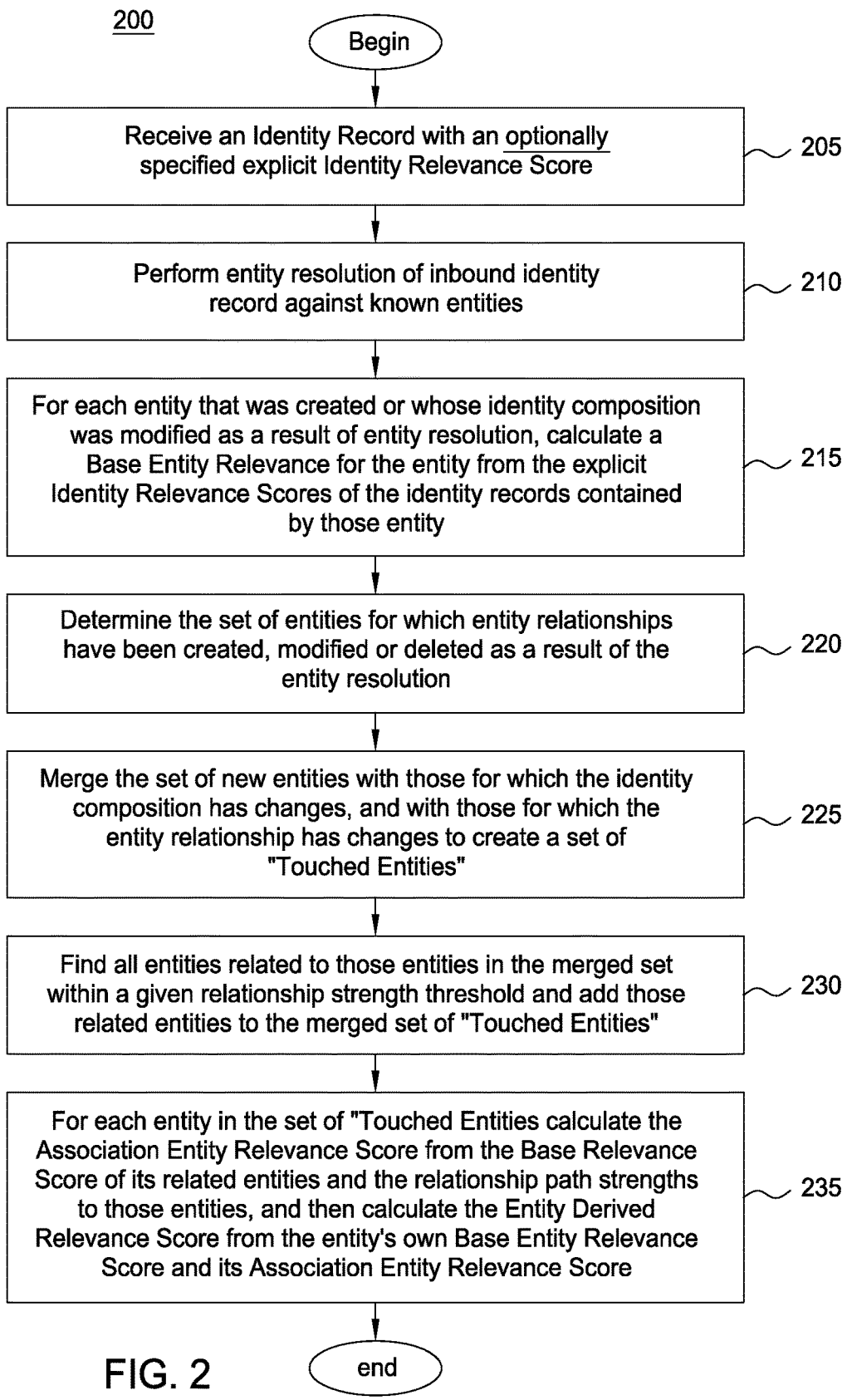
FIG. 2 illustrates a method for performing entity resolution with an identity record and for deriving relevance scores of entities created or modified as result of the entity resolution process, according to one embodiment of the invention.

FIG. 2 illustrates a method 200 for performing entity resolution with an identity record and for deriving relevance scores of entities created or modified as result of the entity resolution process, according to one embodiment of the invention. The method 200 allows a user to introduce new identity records into an entity resolution system, resolve those records to one or more entities and to update relevance scores for certain entities in the system. In this context, a relevance score refers to a calculated measure of importance for an entity, e.g., a quantitative measure of how important a particular customer is to a business. The relevance may be express—where a user specifies which identity records in the system represent their most important clients. Importantly, however, the relevance of an entity may be discovered by the system, e.g., where the system identifies a strong relationship (unknown to the business owner) between one important customer and another customer.

As shown, the method 200 begins at 205 where a user supplies an identity record to the entity resolution system. Optionally, the user may supply an explicit identity relevance score for the identity record. That is, the user may specify a quantitative measure of relevance for the identity represented by the identity record. For example, assume a guest checks into a luxury hotel. In such a case, an identity record which includes the guest's name, home address, and phone number may be supplied to the system. If the guest is checking into a "regular" or "standard" room, the explicit relevance might be omitted (or assigned a score of no relevance). However, if the guest is checking into a penthouse more expensive suite, the user may choose to assign an identity relevance score, e.g., using a normalized scale between 0 and 1, a score of 0.5. Of course, the exact identity relevance score could be tailored to the exigencies of a particular case.

At step 210, the entity resolution system performs entity resolution of using the identity record and the known entities in storage 104. That is, the entity resolution system determines what entity (or entities) in the system the identity record should be associated with. For example, if the inbound identity record represents a person named "J. Smith" with a name and address that matches a entity with records named "Jon Smith," then the inbound identity record could resolve to that entity. If no matching entities are found, then a new entity may be created. Alternatively, an entity could be split. For example, if an entity for "Jon Smith" includes two distinct groups of address or phone numbers, and the inbound identity record references one of the address and phone numbers, but also identifies the identity as "Jon Smith Jr." the entity resolution system might split the entity in two—one for J. Smith (presumably Sr.) with one set of identity records and one for J. Smith Jr. with the other. More simply, as new identity records are entered, the system may more accurately discriminate between distinct entities as well as learn about relationships between entities. An example of the latter could include the record for Jon Smith Jr. having an address that is the same as identity records for an entity named "Jane Smith." In such a case, the system could create an entity representing Jon Smith Jr. as well as identify that a relationship exists between Jon Smith Jr. and Jane Smith (based on the common address).

At step 215, for each entity that was created, or modified as a result of entity resolution, determine a base entity relevance score for the entity from the explicit identity relevance scores for the identity records associated with a given entity. Thus, step 215 includes determining a base relevance score to assign to the entity to which the record received at step 205 is resolved, based on relevance scores assigned to one or more identity records associated with the first entity. Returning to the example of a guest checking into a hotel, if an explicit entity relevance score of 0.5 is assigned each time a guest checks into a penthouse suite, the same guest checking into the same room may have an entity with multiple identity records with an assigned relevance. Or alternatively, assume that the guest has checked into the penthouse suite on several occasions at different hotels in the same ownership group. In such a case, the different records associated with the entity may result in a relative high identity relevance score (based on the individual, explicit, identity relevance scores assigned to records upon checking at each hotel).

At step 220, the entity resolution system may determine a set of entities for which entity relationships have been created, modified or deleted as a result of entity resolution. That is, in addition to determining what entities have been created or modified (step 215) the entity resolution may also identify what relationships between entities were changed as a result of adding the identity record received at step 205 to the system. For example, as noted above, the new record could result in a split of one entity (e.g., an entity for J. Smith being split into entities for both J. Smith Sr. and J. Smith Jr. as well as created relationship between each of these new entities and a Jane Smith.)

At step 225, the set of entities identified at step 215 (modified or created entities) and assigned a base entity relevance score and the set of entities identified at step 220 (entities with new or modified relationships to other entities) are merged—creating a list of "touched entities," i.e., a set of entities having been changed as result of steps 205 and 210). In one embodiment, the set of "touched entities" may be augmented with entities related to the entities in the set. Specifically, at step 230, the entity resolution system may identify entities related to the ones in the "touched entities list." Consider again the entity representing Jane Smith. This entity may have a strong relationship strength with an entity named "Josh Smith," based on the identity records associated with each respective entity. In such a case, Josh Smith may be added to the list of touched entities. More simply, the steps 215, 220 and 230 are performed to identify a group of entities (the "touched entities") that may have an association relevance score affected by the introduction of the identity record at step 205 (and the subsequent creation, merging, and updating of entities as part of the entity resolution process).

Accordingly, at step 235, for each entity in the set of "touched entities," the entity resolution system may calculate an association entity relevance score from the base relevance score of its related entities and the relationship path strengths to those entities. Once the association entity relevance has been determined, the entity resolution system may calculate a derived relevance score from the base entity relevance score and its association entity relevance score. The derived relevance score allows an entity of low relevance (based on the base entity relevance score) to have a high derived relevance score (based on the association relevance score). Returning to the example above, assume Jon Smith Jr. checks into a luxury suite of multiple hotels in a common hotel chain, and as a result, has a high entity relevance score (based on the identity records with a notation of explicit relevance). In such a case, a person with a strong relationship to Jon Smith Jr., (e.g., Jane Smith) would have a derived entity relevance score—even though Jane Smith may have a very low base relevance score. Thus, when Jane Smith checked into one of the hotels, the entity resolution system could let the user know that Jane has a high measure of relevance.

Figure 3:
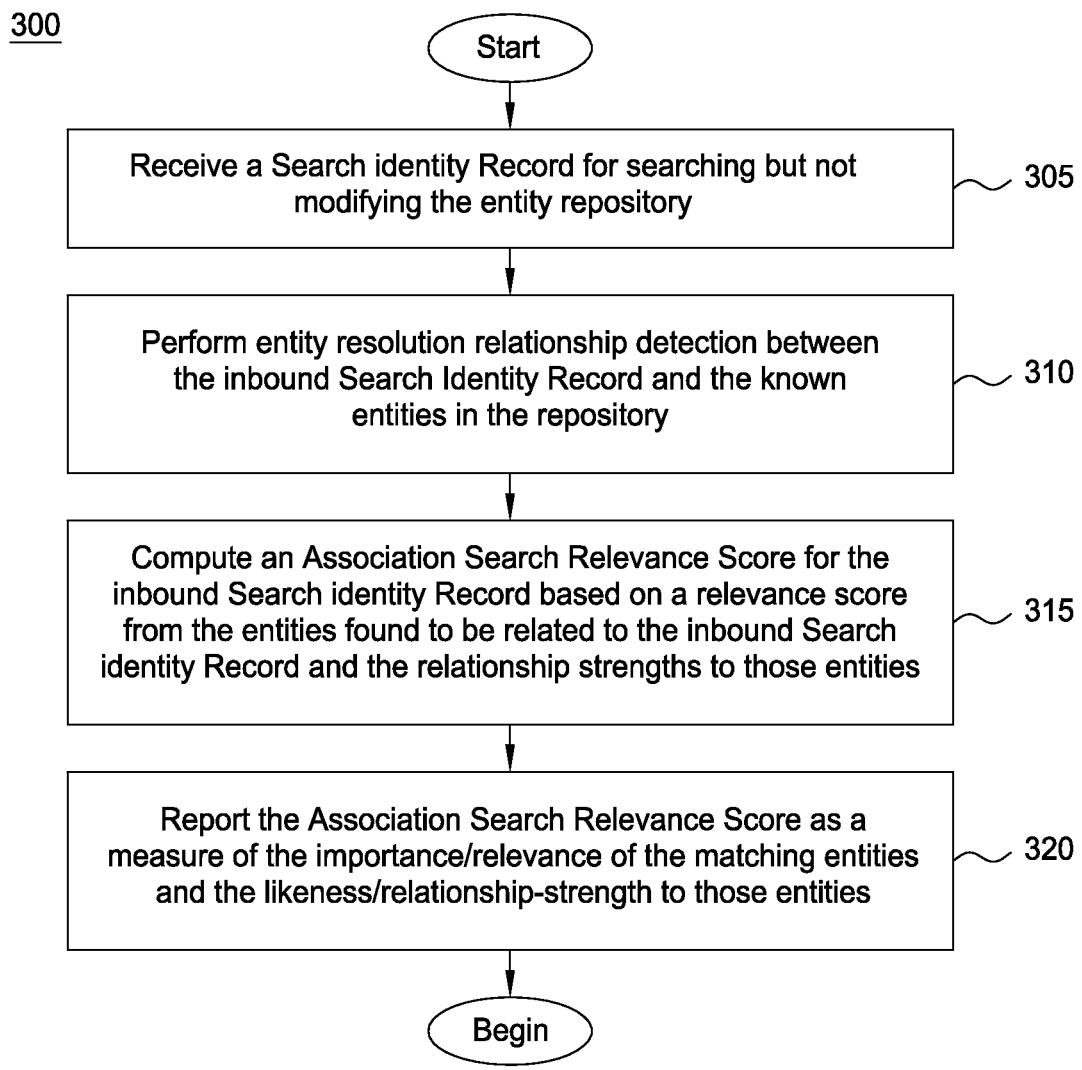
FIG. 3 illustrates a method for performing an entity resolution search with an inbound search identity record and for determining a relevance score for the search, according to one embodiment of the invention.

This result is illustrated in FIG. 3. More specifically, FIG. 3 illustrates a method 300 for performing an entity resolution search with an inbound search identity record and for determining a relevance score for the search, according to one embodiment of the invention. In one embodiment, the search is assigned a measure of relevance, representing the importance of the inbound search identity record (and the individual represented by the search identity record) for searching, but not modifying the entity repository (i.e., without modifying the known entities in storage 104). That is, the search identity record is not input to entity resolution system in the manner described in the method 200 of FIG. 2.

At step 305, the entity resolution system performs entity resolution relationship detection between the inbound search identity record and the known entities in the repository. That is, based on the identity referenced in the search identity record (e.g., represented by a hotel check-in record that includes the name, address and phone number of a hotel guest), the entity resolution system identifies a set of related entities. Thus, continuing the example above, when "Jane Smith" checks into the hotel, the search identity record with Jane's name, address and phone number, is used to mach "Jane Smith" to other entities in the entity resolution system, e.g., John Smith Jr. Note, this process may be performed in cases where the entity resolution system does not include an entity to represent "Jane Smith," i.e., where no identity records have previously been introduced into the entity resolution system.

Nevertheless, using the information in the search identity record—the entity resolution system identifies known entities related to the search identity record. In one embodiment, relationship strengths between entities are used to limit how tenuous a relationship between two entities. For example, assume the relationship strength between Jane Smith and John Smith Jr. May is relatively high, as they share address, last name, and phone number, e.g., a normalized relationship strength of 0.8. Assume that John Smith also has a relationship strength to Alice of 0.3. In such a case, the relationship strength between Jane and Alice (for this second degree relationship) may be the product of the individual relationship strengths. i.e., 0.24. Assuming a threshold relationship strength of 0.5, Alice would not be included in the set of entities at step 310. More simply, at step 310 a set of entities having a relationship to the individual represented in the search identity record is identified.

At step 315, the entity resolution system computes an association search relevance score for the inbound search identity record based on a relevance score from the entities found to be related to the inbound search identity record and the relationship strengths to those entities. Note, the search relevance score may be determined from any of the related entity relevance scores (e.g., the base relevance scores of the related entities, the association relevance score of the related entities, or the derived relevance scores of the related entities or any combination thereof. In one embodiment, which relevance score of the related entities to use may be configured as a parameter of the search—allowing users to identity association relevance for the individual represented by the search identity record using different approaches. Thus, individuals who may not appear relevant/important may be identified as such based on their association with other people (e.g., the wife of the hotel guest VIP).

At step 320, the entity resolution system may report the association relevance score as a quantitative measure of importance/relevance of the matching entities and the likeness/relationship-strength to those entities. That is, the more important the related entities (and the stronger the relationship to those entities), the greater the quantitative measure of relevance assigned to the search identity record (and the individual represented thereby).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention described above provide an entity resolution system configured to process an inbound identity record and to generate a search relevance score for the inbound identity record. One process of resolving identity records and detecting relationships between entities may be performed using a pre-determined or configurable entity resolution rules. Further, the entity resolution system may assign base relevance scores, association relevance scores, and derived relevance scores to each resolved entity. The relevance score for the inbound identity record may be computed based on base relevance scores, association relevance scores, derived relevance scores, and/or relationship strengths of entities related to the inbound identity record. The entity resolution system may compute the search relevance score for the inbound identity record without requiring the entity resolution system to be configured to generate alerts.

While the foregoing is directed to embodiments of the present invention, other and further embodiments of the invention may be devised without departing from the basic scope thereof, and the scope thereof is determined by the claims that follow.

What is claimed is:

1. A computer-implemented method to resolve identity records received by an entity resolution system and referencing a common individual, the computer-implemented method comprising:
   resolving a received identity record against a set of known entities in the entity resolution system to identify a first entity to associate with the received identity record, the first entity representing a first individual;
   identifying one or more entities related to the first entity;
   determining a base relevance score to assign to the first entity based on relevance scores assigned to one or more identity records associated with the first entity;
   determining an association relevance score to assign to the first entity, based on a relevance score assigned to at least one related entity and a relationship strength between the entity and the at least one related entity; and
   responsive to a search request, determining a search relevance score of the first entity, based on at least one of the base relevance score and the association relevance score and by operation of one or more computer processors, wherein the search relevance score is output and represents a quantitative measure of relevance of the first individual to the search request.

2. A computer-readable storage medium containing a program executable to perform an operation to resolve identity records received by an entity resolution system and referencing a common individual, the operation comprising:
   resolving a received identity record against a set of known entities in the entity resolution system to identify a first entity to associate with the received identity record;
   identifying one or more entities related to the first entity;
   determining a base relevance score to assign to the first entity based on relevance scores assigned to one or more identity records associated with the first entity;
   determining an association relevance score to assign to the first entity, based on a relevance score assigned to at least one related entity and a relationship strength between the entity and the at least one related entity; and
   responsive to a search request, determining a search relevance score of the first entity, based on at least one of the base relevance score and the association relevance score and by operation of one or more computer processors when executing the program, wherein the search relevance score is output and represents a quantitative measure of relevance of the first individual to the search request.

3. A system to resolve identity records received by an entity resolution system and referencing a common individual, the system comprising:
   one or more computer processors; and
   a memory containing a program which, when executed by the one or more processors, performs an operation comprising:
      resolving a received identity record against a set of known entities in the entity resolution system to identify a first entity to associate with the received identity record;
      determining a base relevance score to assign to the first entity based on relevance scores assigned to one or more identity records associated with the first entity;
      determining an association relevance score to assign to the first entity, based on a relevance score assigned to at least one related entity and a relationship strength between the entity and the at least one related entity; and
      responsive to a search request, determining a search relevance score of the first entity, based on at least one of the base relevance score and the association relevance score, wherein the search relevance score is output and represents a quantitative measure of relevance of the first individual to the search request.

4. A computer-implemented method to resolve identity records received by an entity resolution system and referencing a common individual, the computer-implemented method comprising:
   receiving a search identity record from a requestor and representing a first individual;
   resolving the search identity record against a set of known entities in the entity resolution system to identify a first entity to associate with the search identity record;
   identifying one or more entities related to the first entity;
   determining an association relevance score to assign to the first entity based on a relevance score assigned to at least one related entity and a relationship strength between the entity and the at least one related entity;
   determining a derived relevance score to assign to the first entity, based on the association relevance score; and
   determining a search relevance score of the first entity, based on at least one of the association relevance score and the derived relevance score and by operation of one or more computer processors, wherein the search relevance score is output and represents a quantitative measure of relevance of the first individual to the requestor.

5. The computer-implemented method of claim 1, wherein the relevance score of the at least one related entity is calculated from a plurality of identity records associated with the at least one related entity.

6. The computer-implemented method of claim 1, wherein the operation further comprises:
   determining a derived relevance score to assign to the first entity based on the base relevance score and the association relevance score.

7. The computer-implemented method of claim 1, wherein the computer-implemented method is to resolve the received identity records to an entity in order to determine base, association, and search relevance scores for the entity, wherein the relevance score of the at least one related entity is calculated from a plurality of identity records associated with the at least one related entity, wherein each related entity is associated with one or more identity records, wherein each related entity represents a distinct individual.

8. The computer-readable storage medium of claim 2, wherein the relevance score of the at least one related entity is calculated from a plurality of identity records associated with the at least one related entity.

9. The computer-readable storage medium of claim 2, wherein the operation further comprises:
   determining a derived relevance score to assign to the first entity based on the base relevance score and the association relevance score.

10. The system of claim 3, wherein the relevance score of the at least one related entity is calculated from a plurality of identity records associated with the at least one related entity.

11. The system of claim 3, wherein the operation further comprises:

determining a derived relevance score to assign to the first entity based on the base relevance score and the association relevance score.

12. The computer-implemented method of claim 4, wherein each related entity is associated with one or more identity records, wherein each related entity represents a distinct individual.

13. A computer-readable storage medium containing a program executable to perform an operation to resolve identity records received by an entity resolution system and referencing a common individual, the operation comprising:
receiving a search identity record from a requestor and representing a first individual;
resolving the search identity record against a set of known entities in the entity resolution system to identify a first entity to associate with the search identity record;
identifying one or more entities related to the first entity;
determining an association relevance score to assign to the first entity based on a relevance score assigned to at least one related entity and a relationship strength between the entity and the at least one related entity;
determining a derived relevance score to assign to the first entity, based on the association relevance score; and
determining a search relevance score of the first entity, based on at least one of the association relevance score and the derived relevance score and by operation of one or more computer processors when executing the program, wherein the search relevance score is output and represents a quantitative measure of relevance of the first individual to the requestor.

14. The computer-implemented method of claim 7, wherein each related entity is associated with one or more identity records, wherein each related entity represents distinct individual.

15. The computer-readable storage medium of claim 13, wherein each related entity is associated with one or more identity records, wherein each related entity represents a distinct individual.

16. The computer-implemented method of claim 14, wherein the operation further comprises:
determining a derived relevance score to assign to the first entity based on the base relevance score and the association relevance score.

17. The computer-implemented method of claim 16, wherein the relevance score assigned to the one or more identity records associated with the first entity provide a quantitative measure of perceived relevance of the identity records to a user of the entity resolution system without requiring any entity alerts to be configured by the user.

18. The computer-implemented method of claim 17, wherein the received identity record is assigned an explicit relevance score by a user of the entity resolution system.

19. The computer-implemented method of claim 18, wherein the base relevance score is determined by an application, wherein the application is configured to independently determine a respective search relevance score from each individual relevance score type selected from the base relevance score, the association relevance score, and the derived relevance score.

20. The computer-implemented method of claim 19, wherein application is further configured to determine a single search relevance score based on three relevance scores including the base relevance score, the association relevance score, and the derived relevance score;
wherein the base relevance score, the association relevance score, the derived relevance score, the search relevance score, and an identity relevance score comprising at least one of the relevance scores each have a distinct score value.

21. The computer-implemented method of claim 20, wherein the application is further configured to independently output for display each relevance score selected from: the base relevance sore, the association relevance score, the derived relevance score, and the search relevance score.

22. The computer-implemented method of claim 21, wherein the base relevance score is only determined:
(i) for each entity that is created as a result of resolving the identity record against the set of known entities in the entity resolution system; and
(ii) for each entity which composition is modified as a result of resolving the identity record.

23. The computer-implemented method of claim 22, wherein the association relevance score is only determined for each entity in a set of touched entities, wherein the set of touched entities is determined by merging:
(i) a set of each entity that is created as a result of resolving the identity record;
(ii) a set of each entity which composition is modified as a result of resolving the identity record;
(iii) a set of each entity for which an entity relationship is created as a result of resolving the identity record;
(iv) a set of each entity for which an entity relationship is modified as a result of resolving the identity record; and
(v) a set of each entity for which an entity relationship is deleted as a result of resolving the identity record.

24. The computer-implemented method of claim 23, wherein the derived relevance score is only determined for each entity for which the association relevance score is determined.

25. The computer-implemented method of claim 24, wherein the search relevance score is determined based further on one or more relationship strengths of at least one entity in the entity resolution system.

* * * * *